(12) United States Patent
Beck et al.

(10) Patent No.: US 6,399,127 B1
(45) Date of Patent: *Jun. 4, 2002

(54) METHOD FOR WARMING CHEESE SLICES

(75) Inventors: Michael E. Beck, Maribel; Donn S. Theuerkauf, Appleton, both of WI (US)

(73) Assignee: Schreiber Foods, Inc., Green Bay, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/303,239

(22) Filed: Apr. 30, 1999

(51) Int. Cl.⁷ .................................................. B05D 5/00
(52) U.S. Cl. ........................ 426/244; 99/358; 99/451; 99/483
(58) Field of Search ............................ 426/244; 99/358, 99/483, 451

(56) References Cited

U.S. PATENT DOCUMENTS

| | | | |
|---|---|---|---|
| 3,062,663 A | * | 11/1962 | Furgal ........................ 99/171 |
| 3,669,003 A | | 6/1972 | King |
| 3,727,308 A | | 4/1973 | Ross |
| 3,842,724 A | | 10/1974 | Korr et al. |
| 3,863,048 A | | 1/1975 | Buckley |
| 3,877,360 A | | 4/1975 | Vigerstrom |
| 3,886,290 A | | 5/1975 | Theimer et al. |
| 3,966,972 A | | 6/1976 | Theimer et al. |
| 4,099,454 A | | 7/1978 | Theimer |
| 4,100,302 A | | 7/1978 | Theimer et al. |
| 4,177,719 A | | 12/1979 | Balaguer |
| 4,522,834 A | | 6/1985 | Miyahara |
| 4,612,199 A | | 9/1986 | Miyahara |
| 5,226,106 A | | 7/1993 | Stirling |
| 5,290,583 A | | 3/1994 | Reznik et al. |
| 5,534,278 A | | 7/1996 | DeRuyter |
| 5,540,941 A | | 7/1996 | Stevens et al. |
| 5,607,613 A | | 3/1997 | Reznik |
| 5,609,900 A | | 3/1997 | Reznik |
| 5,629,037 A | | 5/1997 | Gaffney |
| 5,636,317 A | | 6/1997 | Reznik |
| 5,768,472 A | | 6/1998 | Reznik |
| 5,789,006 A | | 8/1998 | Jones et al. |
| 5,863,580 A | | 1/1999 | Reznik |

FOREIGN PATENT DOCUMENTS

JP  04 016168 A  1/1992

OTHER PUBLICATIONS

PCT International Search Report dated Feb. 28, 2000.

* cited by examiner

*Primary Examiner*—Curtis E. Sherrer
*Assistant Examiner*—Hao Mai
(74) *Attorney, Agent, or Firm*—Niro, Scavone, Haller & Niro

(57) ABSTRACT

The present invention is therefore directed to a method and apparatus for warming a stack of cheese slices. In accordance with the invention, the stack of cheese slices is positioned between and in juxtaposition with opposing generally planar electrodes, each of the electrodes having a surface area generally coextensive with that of the cheese stack. Next, a conductive material is interposed between each electrode and the cheese stack to reduce contact resistance. Once properly assembled, an electric current is passed between the electrodes, through both the conductive material and the cheese, thus warming the individual cheese slices through ohmic heating. In accordance with one embodiment of the invention, the conductive material is a moistened paper sheet.

17 Claims, 3 Drawing Sheets

METHOD FOR WARMING CHEESE SLICES

BACKGROUND OF THE INVENTION

The present invention relates to the processing of cheese products and, more particularly, to a method and apparatus for raising the temperature of individual cheese product slices.

For many years, the so-called "fast food" restaurant trade has offered a variety of food items, typically in sandwich form, that feature a slice of cheese in combination with other foodstuffs. The classic example is the cheeseburger. The cheese slices, usually processed cheese, are conventionally delivered to these restaurants in loaves, comprising from about forty to one hundred sixty slices, and are maintained in refrigeration until shortly before use. As a result, the cheese slices are relatively cold, at about 40° F., and because they are stacked in loaves, may not reach room temperature for several hours after being removed from refrigeration.

It has long been recognized that these "cold" cheese slices are undesirable because they tend to reduce the temperature of the cooked beef, poultry or fish pattie when the sandwich is made. As a result, a need has existed for a simple, inexpensive and rapid means for heating the individual slices, while they remain in a stacked "loaf" form, to raise the cheese slices to about room temperature without in any way altering the physical integrity and appearance of the individual slices and without affecting adversely the ability to peel the individual slices from the stacked loaf.

SUMMARY OF THE INVENTION

The present invention is therefore directed to a method and apparatus for warming a stack of cheese slices. In accordance with the invention, the stack of cheese slices is positioned between and in juxtaposition with opposing generally planar electrodes, each of the electrodes having a surface area generally coextensive with that of the cheese stack. Next, a conductive material is interposed between each electrode and the cheese stack to reduce contact resistance. Once properly assembled, an electric current is passed between the electrodes, through both the conductive material and the cheese, thus warming the individual cheese slices through ohmic heating. In accordance with one embodiment of the invention, the conductive material is a moistened paper sheet.

An important aspect of the invention is that the stack of cheese slices is generally uniformly warmed from typical refrigerated temperatures to above about 60° F. in a relatively short time period, and this is accomplished while maintaining substantially the physical integrity of the individual cheese slices. Thus, the color, texture, and peelability of the cheese remain substantially unchanged.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

DETAILED DESCRIPTION OF THE PREFERRED EMBODIMENTS

Figure 1:
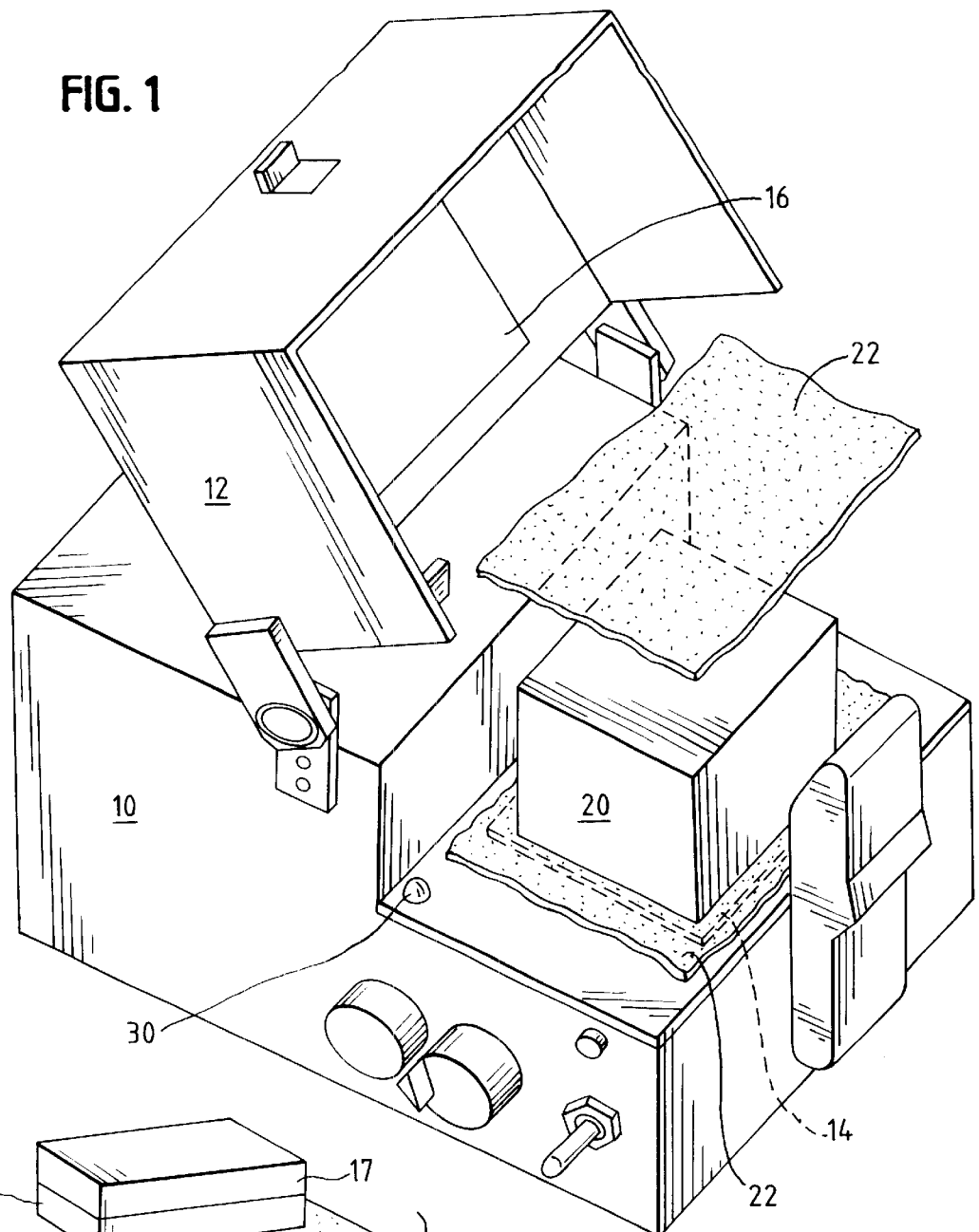
FIG. 1 is a perspective view of an apparatus used in the practice of the present invention.
Figure 2:
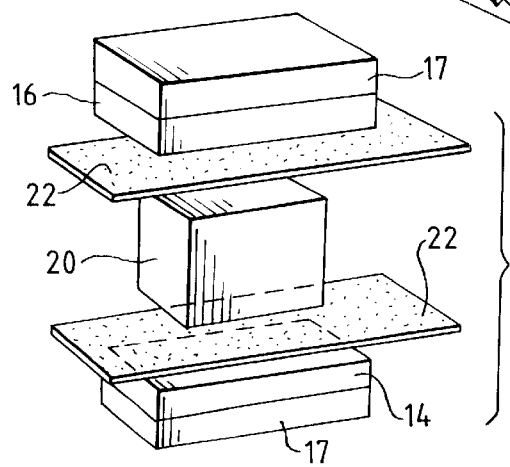
FIG. 2 is an exploded diagramatic view illustrating the arrangement of the cheese stack, the conductive material and the heating electrodes as employed in the practice of the present invention.
Figure 3:
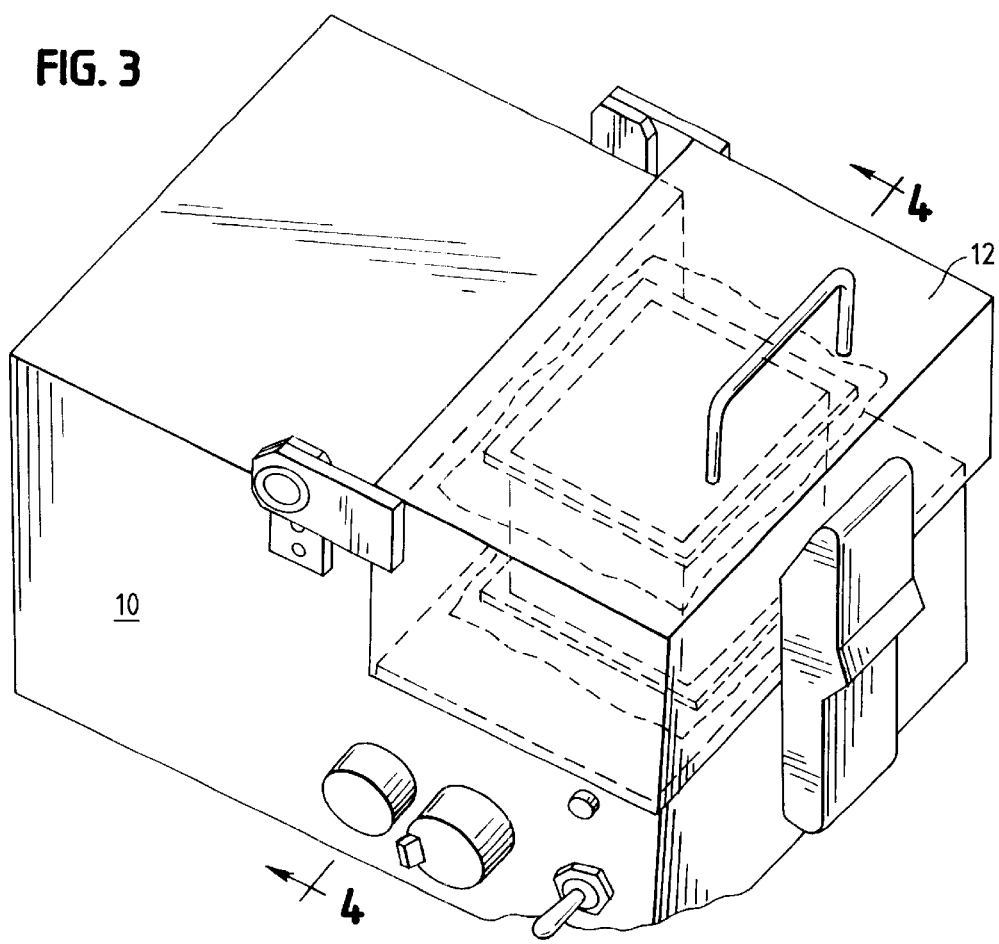
FIG. 3 is a perspective view similar to that of FIG. 1, but showing the apparatus with the cover closed.
Figure 4:
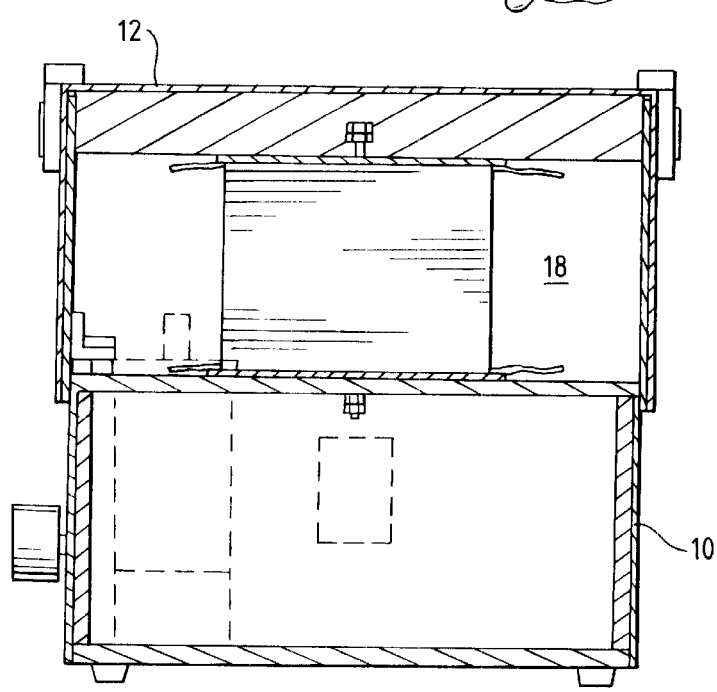
FIG. 4 is a cross-sectional view taken along line 4—4 of FIG. 3.

Set forth below is a description of what is currently believed to be the preferred embodiment and/or best example of the invention claimed. Future and present alternatives and modifications to this preferred embodiment are contemplated. Any alternatives or modifications which make insubstantial changes in function, in purpose, in structure or in result are intended to be covered by the claims of this patent.

The method and apparatus of the present invention are used to warm a stack of individual cheese slices. As use here, "cheese" is intended to cover a broad spectrum of food items, including both natural and processed cheeses. Typically, the cheese slices are from about 2¼ inches to 3½ inches in width and length and are stacked in loaves that comprise from about forty to one-hundred sixty individual slices. The invention, however, can be implemented with any number of slices in a "stack". The preferred stack size comprises from about twenty to sixty individual cheese slices.

As illustrated in FIGS. 1–4, the apparatus of the present invention comprises a countertop appliance having a base 10 and a cover 12 which is pivotally joined to the base. A pair of opposing heater electrodes 14 and 16 are mounted to the base and cover, respectively. The electrodes are preferably fabricated from a material which complies with USDA guidelines for contact with food products. 316 stainless steel is one suitable electrode material. The electrodes are mounted to the base and cover via insulating pads 17 which are fabricated from a dielectric plastic such as polyethylene (ultra high molecular weight polyethylene). An adhesive such as Dow Corning RTV 732 Multi Purpose Sealant (clear) may be used to bond the electrodes to the insulating pads. Again, this sealant meets FDA regulation No. 21 CFR 177.2600 and USDA rating P-1. When the cover 12 is closed, the base and cover, together, form a heating chamber 18 which is suitably dimensioned for a particularly sized stack of cheese slices 20. The electrodes 14 and 16 have a surface area generally coextensive with the area of the cheese stack facing each electrode to facilitate uniform current flow and heating throughout the stack. Preferably, the cheese is arranged so that the edges of each individual slice are in contact with the electrodes, although it is possible to also arrange the stack so that only the upper and bottom cheese slices contact the electrodes.

Figure 5:
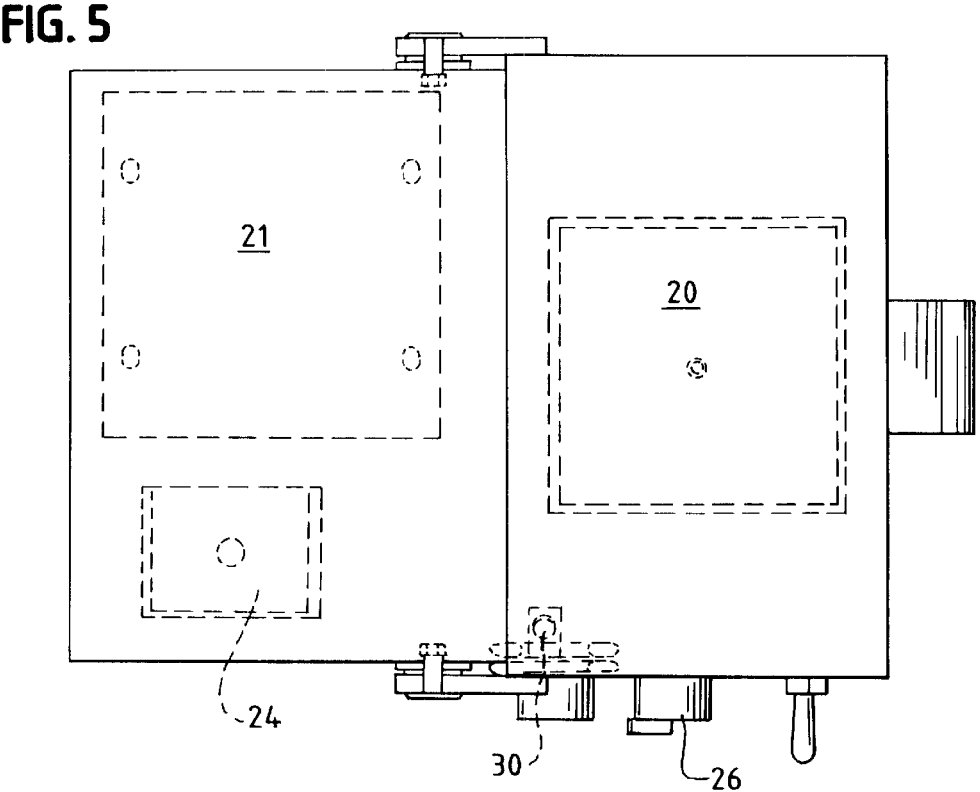
FIGS. 5 and 6 are top and side views, respectively, of the apparatus illustrated in FIG. 1.
Figure 6:
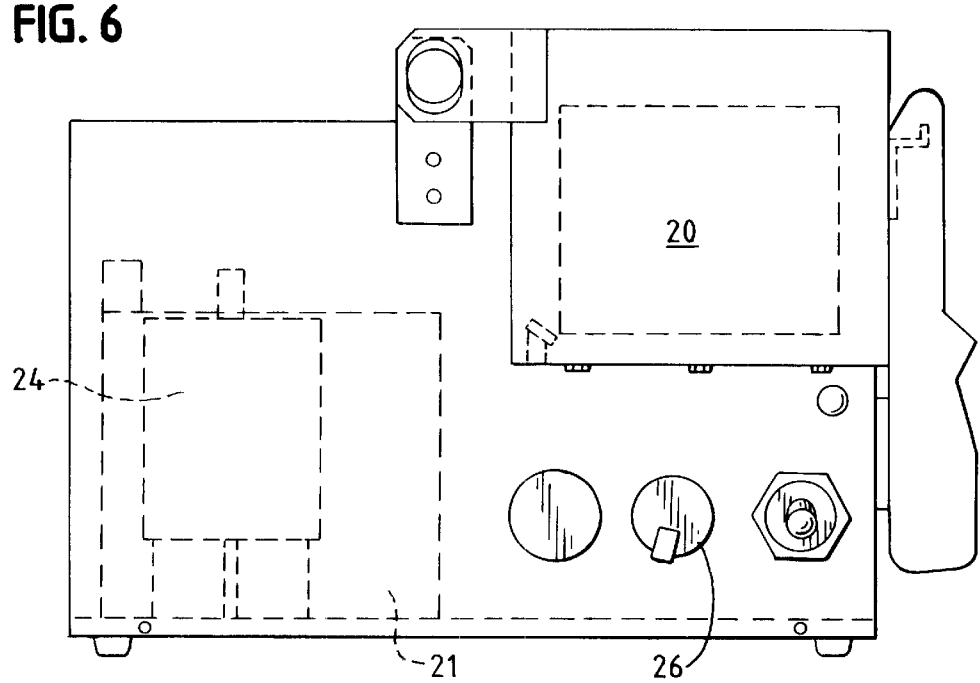

As illustrated in FIGS. 5 and 6, the appliance is powered by a conventional 110 volt AC power supply which is reduced via a transformer 21. One exemplary transformer for use in the practice of the present invention is a multi-purpose international transformer Model No. MPI-250-8 supplied by Signal Transformer Co. Inc. of Inwood, N.Y. The reduced voltage may be varied from about 30 volts AC to about 60 volts AC; although at the lower voltage the time period to warm the cheese increases, while at the higher voltage greater care must be exercised to minimize burning or discoloration. The preferred power range is from about 40 to 50 volts AC at 60 HZ. The particularly preferred power is 45 volts AC at 60 HZ which will raise a 60 slice stack of processed cheese from about 45° F. to about 70° F. in approximately two minutes.

In accordance with an important feature of the present invention, a conductive material is placed on each side of the cheese stack which faces the heater electrodes. The preferred form of conductive material is a water moistened paper sheet 22. It has been found that placing the moistened sheet at the cheese/electrode interface reduces contact resistance at the interface thereby substantially eliminating any burning or discoloration of the cheese. Other electrically conductive compositions may also be employed with the paper sheeting as a suitable conductive material. Although many forms of paper sheeting may be used, even conventional paper towel sheets, it has been found that coffee filter stock is particularly preferred. Also, the weight of the paper stock has been determined to effect performance. Generally, lighter weight papers do not perform as well with discoloration of the cheese occurring. With coffee filter papers above about 32 Lbs. basis weight (pounds per ream) the physical integrity of the cheese slices is maintained. Most preferably, a coffee filter paper stock of 40 Lbs. basis weight moistened with approximately three grams of water is used when heating a 3 inch square processed cheese slice loaf having 60 slices. A suitable coffee filter paper stock is available from Rockline Industries having the following specifications:

| Basis Weight | 32.0 +/− 1.0 |
| Caliper | 0.0050 minimum |
| Dry Tensile (Lbs.) | |
| MD | 11.0 |
| CD | 6.0 |
| Wet Tensile (Lbs.) | |
| MD | 3.3 |
| CD | 1.9 |

This stock also complies with FDA regulation No. 21 CFR 176.170.

When the cover 12 is fully closed and latched to base 10, the chamber 18 is sized to apply a moderate pressure through the heater electrodes to the paper sheets 22 and cheese stack 20. Tests have indicated that the pressure to be applied to the cheese stack is preferably in the range of about 2 to 10 PSI, with the more preferred range being from about 3 to 5 PSI. The most preferred pressure applied to the cheese stack is 3.5 PSI.

Other features of the apparatus illustrated in the drawings include an appropriate built-in timer 24 and timer setting dial 26. One suitable timer is supplied by Eagle Signal under model number 13846. Also, any one of a variety of temperature sensing circuit controls well known to those of skill in the art may be employed to automatically terminate heating of the cheese slices once a preselected cheese temperature has been reached. Preferably, the base 10 is fitted with a circuit cutout switch 30 which holds open the heater electrode circuit until the cover 12 actuates the switch when fully closed and latched.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims.

We claim:

1. A method for warming a stack of cheese slices comprising:

arranging the stack of cheese slices between opposing generally planar electrodes, each electrode having a surface area substantially coextensive with the area of the cheese stack adjacent the electrode;

placing a conductive moistened paper material at the interfaces between each electrode and the cheese stack to reduce contact resistance; and generating an electric current through the electrodes, conductive material and cheese stack for a period of time sufficient to heat the cheese stack while maintaining the physical integrity of the individual cheese slices within the stack.

2. The method of claim 1 wherein the cheese stack comprises between about 20 to 60 individual cheese slices.

3. The method of claim 1 wherein the cheese slices are arranged such that opposing edges of the cheese slices are positioned adjacent the electrodes.

4. The method of claim 1 wherein the cheese slices are arranged such that top and bottom surface of the stack are positioned adjacent the electrodes.

5. The method of claim 1 wherein the conductive material is an absorbent sheet material having a high water content.

6. The method of claim 1 wherein the conductive material comprises a paper sheet moistened with water.

7. The method of claim 6 wherein the paper sheet is a coffee filter paper stock having a basis weight in excess of about 32 pounds per ream.

8. The method of claim 1 wherein the cheese stack has an initial temperature in the range of about 35–45° F. and is heated to a temperature above about 60° F.

9. The method of claim 8 wherein the cheese stack is heated to above about 60° F. in less than 15 minutes.

10. The method of claim 8 wherein the cheese stack is heated to above about 60° F. in less than 5 minutes.

11. The method of claim 8 wherein the individual slices within the stack remain substantially separate and peelable, one at a time, from the stack.

12. The method of claim 1 wherein the electric current is generated by application of about 40–50 volts AC across the stack.

13. The method of claim 8 wherein the variance in temperature of the individual slices after heating is less than about 20%.

14. The method of claim 1 wherein the cheese slices are about 2¼ inches to 3½ inches in length and width.

15. A method for warming a stack of cheese slices comprising:

positioning the cheese slices between a pair of electrodes;

positioning a moistened absorbent paper sheet between the cheese slices and each electrode;

moving one or both electrodes to engage the sheets and press the sheets against the cheese product slices; and generating an electrical current through the electrodes, sheets and slices for a period of time to heat the cheese slices to a desired elevated temperature, wherein the electric current is generated by application of about between 30–60 volts AC across the stack.

16. The method of claim 15 wherein the force applied by the electrodes to the assembled sheets and slices is from about 2.0 to 10 PSI.

17. The method of claim 8 wherein the individual slices of the stack maintain substantially their original color.

* * * * *